(12) United States Patent
Gibble et al.

(10) Patent No.: US 6,978,325 B2
(45) Date of Patent: Dec. 20, 2005

(54) TRANSFERRING DATA IN VIRTUAL TAPE SERVER, INVOLVES DETERMINING AVAILABILITY OF SMALL CHAIN OF DATA, IF LARGE CHAIN IS NOT AVAILABLE WHILE TRANSFERRING DATA TO PHYSICAL VOLUMES IN PEAK MODE

(75) Inventors: Kevin Lee Gibble, Tucson, AZ (US); Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 10/230,612

(22) Filed: Aug. 29, 2002

(65) Prior Publication Data

US 2004/0044834 A1 Mar. 4, 2004

(51) Int. Cl.⁷ .............................................. G06F 13/14
(52) U.S. Cl. ............................ 710/33; 710/40; 710/58; 711/133; 711/159; 711/111; 711/4; 711/112; 711/113; 711/154; 711/158; 711/170
(58) Field of Search ............................ 710/33, 40, 58; 711/133, 159, 111, 4, 112, 113, 118, 154, 170, 158, 202, 213; 707/204

(56) References Cited

U.S. PATENT DOCUMENTS

| | | | |
|---|---|---|---|
| 4,530,055 A | 7/1985 | Hamstra et al. ............. 711/136 |
| 5,043,885 A | 8/1991 | Robinson .................... 711/133 |
| 5,164,909 A | 11/1992 | Leonhardt et al. .......... 700/215 |
| 5,253,351 A | 10/1993 | Yamamoto et al. ......... 711/118 |
| 5,390,318 A | 2/1995 | Ramakrishnan et al. .... 711/158 |
| 5,412,780 A | 5/1995 | Rushton ...................... 711/113 |
| 5,499,354 A | * 3/1996 | Aschoff et al. .............. 711/129 |
| 5,546,557 A | 8/1996 | Allen et al. .................. 711/111 |
| 5,636,355 A | 6/1997 | Ramakrishnan et al. .... 711/113 |
| 5,790,828 A | 8/1998 | Jost .............................. 711/4 |
| 5,829,023 A | 10/1998 | Bishop ........................ 711/118 |
| 5,926,834 A | * 7/1999 | Carlson et al. ............. 711/152 |
| 5,956,301 A | 9/1999 | Dimitri et al. ........... 369/30.31 |
| 6,023,709 A | * 2/2000 | Anglin et al. ................ 707/204 |
| 6,029,179 A | * 2/2000 | Kishi .......................... 707/202 |
| 6,038,490 A | 3/2000 | Dimitri et al. .............. 700/214 |
| 6,067,599 A | 5/2000 | Kishi et al. .................. 711/113 |
| 6,105,037 A | * 8/2000 | Kishi .......................... 707/201 |
| 6,163,773 A | 12/2000 | Kishi ........................... 706/16 |
| 6,304,880 B1 | 10/2001 | Kishi .......................... 707/200 |
| 6,336,163 B1 | 1/2002 | Brewer et al. .............. 711/112 |
| 6,339,778 B1 | 1/2002 | Kishi .......................... 707/200 |
| 6,351,685 B1 | 2/2002 | Dimitri et al. .............. 700/214 |
| 6,496,901 B1 | * 12/2002 | De Martine et al. ........ 711/113 |
| 6,718,427 B1 | * 4/2004 | Carlson et al. ................ 711/5 |
| 2003/0236942 A1 | * 12/2003 | Kishi et al. ................. 711/113 |
| 2004/0044828 A1 | * 3/2004 | Gibble et al. .................. 711/4 |

OTHER PUBLICATIONS

U.S. patent application Publication No. US2001/0001870 A1, dated May 24, 2001, entitled "System and Method for On–Line, Real Time, Data Migration", by inventors Ofek et al.

(Continued)

*Primary Examiner*—Hong Kim
(74) *Attorney, Agent, or Firm*—Tanaki K. Davda; Konrad Raynes & Victor LLP (57) ABSTRACT

Disclosed is a system, method, and program for transferring data. Whether data is being transferred to physical volumes in peak mode is identified. If the data is being transferred in peak mode, whether a large chain of data is available for transfer to physical volumes is determined. If the large chain of data is not available, whether a small chain of data is available for transfer to physical volumes is determined. If the small chain of data is available, the small chain of data is transferred to physical volumes. Additionally, if one or more files that have ages greater than a steady state age threshold are available, the one or more files are transferred to the one or more physical volumes. If one or more files that have ages greater than a peak age threshold are available, the one or more files are transferred to the one or more physical volumes.

33 Claims, 10 Drawing Sheets

OTHER PUBLICATIONS

U.S. application Ser. No. 10/230,936, filed Aug. 29, 2002, entitled "Method, System, and Program for Managing Storage Units in Storage Pools" by inventors W.C. Carlson et al.

U.S. application Ser. No. 10/230,639, filed Aug. 29, 2002, entitled "Method, System, and Article of Manufacture for Managing Storage Pools" by inventors G.T. Kishi et al.

U.S. application Ser. No. 10/230,522, filed Aug. 29, 2002, entitled "Method, System, and Article of Manufacture for Returning Physical Volumes" by inventors G.T. Kishi et al.

U.S. application Ser. No. 10/231,816, filed Aug. 29, 2002, entitled "Method, System, and Article of Manufacture for Borrowing Physical Volumes" by inventors G.T. Kishi et al.

U.S. application Ser. No. 10/230,789, filed Aug. 29, 2002, entitled "Method, System, and Program for Managing an Out of Available Space Condition" by inventors K. L. Gibble et al.

U.S. application Ser. No. 10/231,815, filed Aug. 29, 2002, entitled "Method, System, and Program for Moving Data Among Storage Units" by inventors G.T. Kishi et al.

M. Werner, et al., "Magstar Peer–To–Peer Virtual Tape Server Planning and Implementation Guide", IBM Corp., Dec. 2000, Document No. SG24–6115–00, Chapters 1 and 2.

IBM Corp., "Logical Grouping of Data Storage Media in a Library System", Technical Disclosure Bulletin, vol. 35, No. 5, Oct. 1992, pp. 17–20.

* cited by examiner

TRANSFERRING DATA IN VIRTUAL TAPE SERVER, INVOLVES DETERMINING AVAILABILITY OF SMALL CHAIN OF DATA, IF LARGE CHAIN IS NOT AVAILABLE WHILE TRANSFERRING DATA TO PHYSICAL VOLUMES IN PEAK MODE

BACKGROUND OF THE INVENTION

1. Field of the Invention

The present invention is directed to transferring data from cache to storage media.

2. Description of the Related Art

In prior art virtual tape storage systems, hard disk drive storage emulates tape drives and tape cartridges. For instance, host systems perform input/output (I/O) operations with respect to a tape library by performing I/O operations with respect to a set of hard disk drives that emulate the tape library. In prior art virtual tape storage systems, such as the International Business Machines (IBM) Magstar** Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

**IBM, Tivoli, RS/6000, AIX, and Magstar, OS/390 are trademarks of International Business Machines Corp.

The DASD functions as a cache to volumes in the tape library. In VTS operations, the VTS processes the host's requests to access a volume in the tape library and returns data for such requests, if possible, from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache.

Since the cache can satisfy requests faster than the tape library, I/O requests can be satisfied faster if frequently accessed volumes are kept in the cache. However, since the capacity of the cache is relatively small when compared to the tape library, not all volumes can be kept in the cache. Hence, the VTS also premigrates volumes from the cache to the tape library, i.e., the VTS transfers data from the cache to the tape cartridges in the tape library. The process of transferring data from the cache to the tape cartridges is referred to as premigration. Eventually, these premigrated volumes will be removed from the cache and shortened to a pointer to the data on tape cartridges, freeing space in the cache for new data. This shortening, or "migration," operation is very fast, and the performance bottleneck in the VTS is the premigration operation.

Notwithstanding the use of the VTS to premigrate volumes from the cache to the tape library, there is a need in the art for improved techniques for premigrating volumes from the cache to the tape library.

SUMMARY OF THE INVENTION

Provided are a method, system, and program for transferring data. Whether data is being transferred to physical volumes in peak mode is identified. If the data is being transferred in peak mode, whether a large chain of data is available for transfer to physical volumes is determined. If the large chain of data is not available, whether a small chain of data is available for transfer to physical volumes is determined. If the small chain of data is available, the small chain of data is transferred to physical volumes.

In certain implementations, the small chain of data comprises one or more logical volumes and transferring the small chain of data comprises transferring the one or more logical volumes from cache to one or more of the physical volumes mounted on physical devices. In additional implementations, the physical volumes are organized into pools of physical volumes and transferring the small chain of data further comprises transferring each of the logical volumes to one of the pools of physical volumes.

In further implementations, it is determined that the large chain of data is available and the large chain of data is transferred to physical volumes. In yet further implementations, the large chain of data comprises one or more logical volumes and transferring the large chain of data comprises transferring the one or more logical volumes from cache to one or more of the physical volumes mounted on physical devices. In other implementations, the physical volumes are organized into pools of physical volumes and transferring the large chain of data further comprises transferring each of the logical volumes to one of the pools of physical volumes.

In certain implementations, it is determined that the data is being transferred in steady state mode and one or more large chains of data are transferred to physical volumes.

In additional implementations, it is determined that the data is being transferred in steady state mode. It is determined whether one or more files that have ages greater than a steady state age threshold are available. If one or more files that have ages greater than the steady state age threshold are available, the one or more files are transferred to physical volumes.

In further implementations, it is determined whether one or more files that have ages greater than a peak age threshold are available prior to determining whether a large chain of data is available for transfer to physical volumes. If one or more files that have ages greater than the steady state age threshold are available, the one or more files are transferred to physical volumes.

The described implementations of the invention provide a method, system, and program for premigrating data. In certain implementations, a technique for ensuring that logical volumes are premigrated to physical volumes in a virtual tape server (VTS) system that uses multiple volume pools is provided.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
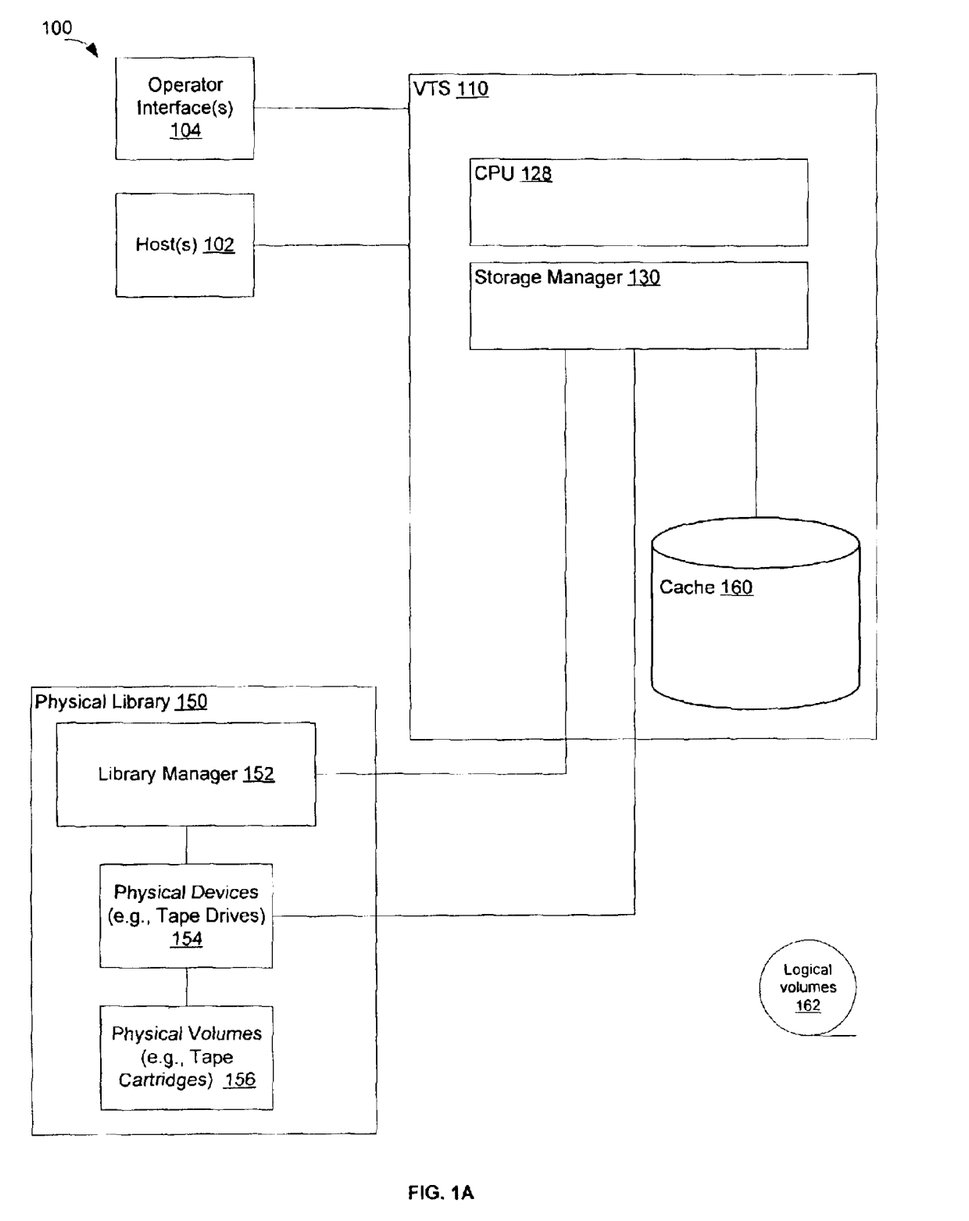
FIG. 1A illustrates, in a block diagram, a computing environment in accordance with some implementations of the invention.

FIG. 1A illustrates, in a block diagram, a computing environment in accordance with some implementations of the invention. A Virtual Tape Server (VTS) 110 emulates virtual tapes as files on a direct access storage device (DASD) cache. Additional VTSs may be deployed, but for purposes of illustration, a single VTS 110 is shown. The VTS 110 is any server computational device known in the art and includes any operating system known in the art. For instance, in certain implementations of the invention, the VTS 110 may be implemented in one or more computers comprising an IBM RS/6000 system and include the IBM AIX operating system.

**IBM, Tivoli, RS/6000, AIX, and Magstar, OS/390 are trademarks of International Business Machines Corp.

One or more hosts 102 and one or more operator interfaces connect to the VTS 110. The hosts 102 and operator interfaces 104 may be any computational device known in the art, such as a personal computer, a workstation, a server, a mainframe, a hand held computer, a palm top computer, a telephony device, network appliance, etc. The hosts 102 and operator interfaces 104 may include any operating system known in the art, such as the IBM OS/390** operating system.

**IBM, Tivoli, RS/6000, AIX, and Magstar, OS/390 are trademarks of International Business Machines Corp.

The VTS 110 includes at least one central processing unit (CPU) 128 and an application, such as a storage manager 130 that optimizes storage utilization. The storage manager 130 may be implemented either as a standalone application or as a part of one or more other applications. The storage manager 130 controls access to a cache 160, such as a DASD file buffer, and a physical library 150, such as an automated tape library. In certain implementations, the storage manager 130 may include software to utilize a tape library, such as the IBM Magstar Virtual Tape Server, and the IBM ADSTAR Distributed Management (ADSM) software or Tivoli Storage Manager. The storage manager 130 may perform data movement operations between the hosts 102, the cache 160, and the physical library 150. Further details of the VTS technology are described in the IBM publication "Magstar** Peer-to-Peer Virtual Tape Server Planning and Implementation Guide," IBM document no. SG24-6115-00 (Copyright IBM, 2000), which publication is incorporated herein by reference in its entirety.

**IBM, Tivoli, RS/6000, AIX, and Magstar, OS/390 are trademarks of International Business Machines Corp.

The physical library 150 may comprise an IBM Magstar Tape Library, such as the Magstar 3494 Tape Library, or any other tape library system known in the art. In certain implementations, the physical library 150 comprises numerous physical devices 154, such as tape drives, CD ROM drives, DVD ROM drives, etc. that provide access to physical volumes 156. In certain implementations, the VTS 110 provides the image of up to 256 tape drives 154 (e.g., 3490 tape drives from IBM).

The cache 160 may comprise numerous interconnected hard disk drives. The cache 160 stores logical volumes 162. In certain implementations, the logical volumes 162 are not organized into pools, although the physical volumes 156 are organized into pools. Moreover, the logical volumes 162 may be stored anywhere in cache, and the cache is not partitioned with each partition being associated with a physical volume pool. The cache 160 improves performance by allowing host I/O requests from the hosts 102 to the physical library 150 to be serviced from the faster accessible cache 160 as opposed to the slower accessible physical library 150. The disks in the cache may be arranged as a Direct Access Storage Device (DASD), Just a Bunch of Disks (JBOD), Redundant Array of Inexpensive Disks (RAID), etc.

The hosts 102 exchange tape operations with the VTS 110. The execution of the tape operations retrieves data from or stores data into logical volumes 162 stored in the cache 160. The VTS automatically premigrates (i.e., offloads) logical volumes 162 in cache 160 after they have been accessed by the hosts 102 onto physical volumes 156. In certain implementations, the least recently used (LRU) logical volume 162 is transferred before other logical volumes 162. If one of the hosts 102 requires a logical volume 162 that is not in the cache 160, the storage manager 130 of the VTS 110 commands the tape library 150 to mount the appropriate physical volume 156 into a physical device 154. Then, the required data is copied from the physical volume 156 as a logical volume 156 in the cache 160 (i.e., the data is recalled).

Figure 1B:
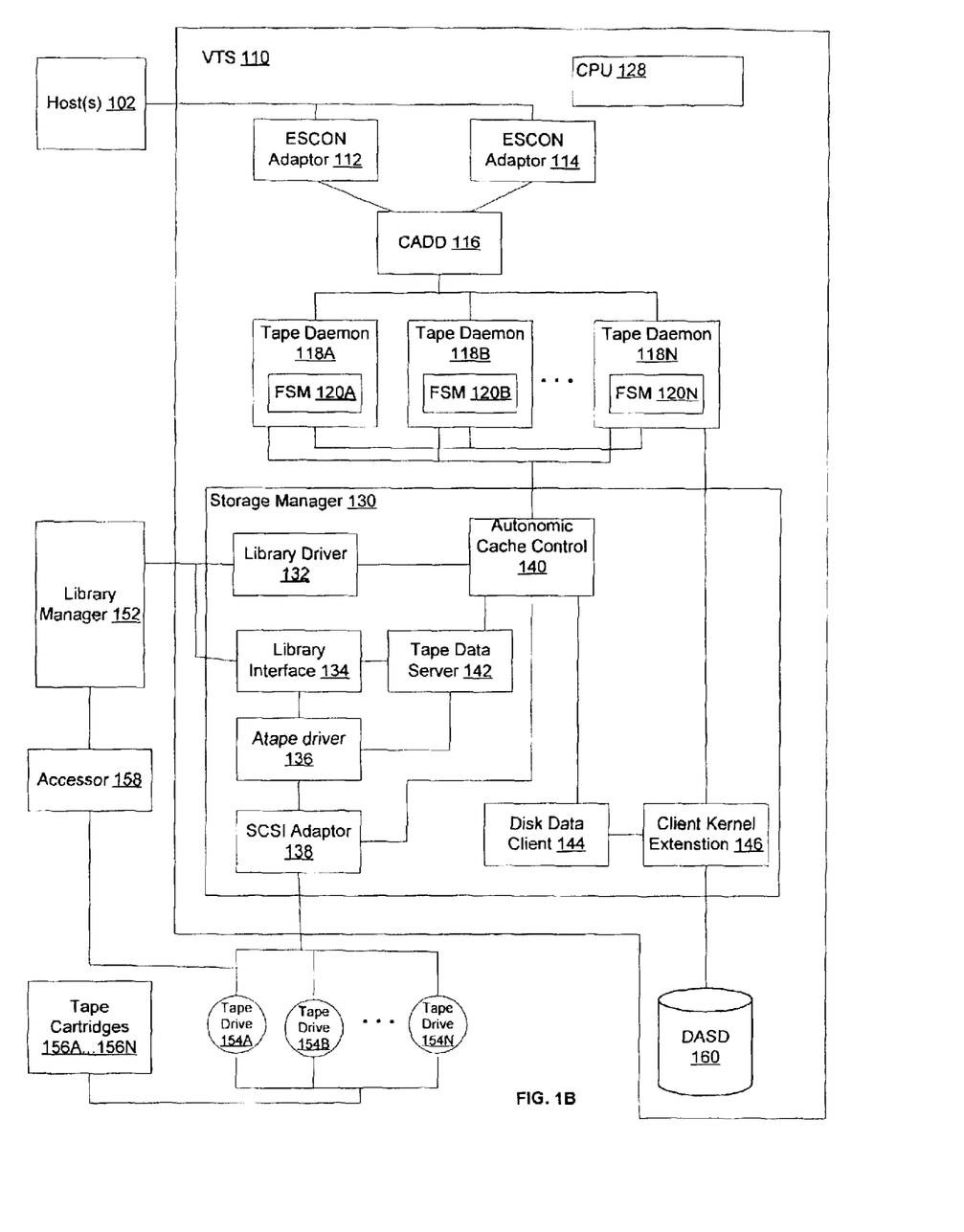
FIG. 1B illustrates, in a block diagram, further details of a computing environment in accordance with implementations of the invention.

FIG. 1B illustrates, in a block diagram, further details of a computing environment in accordance with implementations of the invention. The hosts 102 may connect to the VTS 110 through host data interfaces, such as Enterprise System Connection (ESCON)** adaptors 112 and 114 or any other switching mechanism known in the art (e.g., fibre channel, Storage Area Network (SAN) interconnections, etc.). The CADD 116 is a device driver for tape daemons 118A . . . 118N. Tape daemons 118A . . . 118N receive read and write tape operations from hosts 102. For a write operation, the tape daemons 118A . . . 118N receive data, create logical volumes 162, and write the logical volumes 162 as files in cache 160. For read operations, the tape daemons 118A . . . 118N access the cache 160 to retrieve data through client kernel extension 146 and return the data to hosts 102. The hosts 102 believe that they are communicating with physical tape drives, rather than with the tape daemons 118A . . . 118N, which emulate the physical tape drives. Each tape daemon 118A . . . 118N includes a file system manager (FSM) 120A . . . 120N that is used to create files in cache 160.

The storage manager 130 transfers data from cache 160 to tape drives 154A . . . 154N. In certain implementations, the storage manager 130 includes multiple components, as illustrated in FIG. 1B. The autonomic cache control 140 controls the transfer of data from cache 160 to tape drives 154A . . . 154N in response to transfer operations received from hosts 102. Additionally, the autonomic cache control 140 controls the rate at which the tape daemons 118A . . . 118N write data to the cache 160.

In particular, the autonomic cache control 140 receives notification from one of the hosts 102 to transfer data. The hosts 102 indicate which logical volumes 162 are to be placed into particular pools of tape cartridges 156A . . .

156N. Moreover, the autonomic cache control 140 maintains metadata on which files are stored in cache 160. The autonomic cache control 140 notifies the disk data client 144 to transfer data. The disk data client 144 requests data from the client kernel extension 146, which retrieves the requested data from cache 160 and forwards the data to disk data client 144. The disk data client 144 forwards the data to tape data server 142 at the request of the autonomic cache control 140.

The tape data server controls the writing of data to tape drives 154A . . . 154N. The data is sent from tape data server to Atape driver 136 to SCSI adaptor 138 and to the tape drives 154A . . . 154N. The tape data server uses a library interface 134 to tell the library manager 152 which tape cartridge 154 is to be put into one of the tape drives. The autonomic cache control 140 sends messages to the library manager 152 through the library driver 132.

The library manager 152 manages the mounting and unmounting of the tape cartridges 156A . . . 154N from the tape drives 154A . . . 154N. When the library manager 152 receives a notification to mount or unmount a tape cartridge 154, the library manager 152 notifies the accessor 158, which is used to access the tape drives 154A . . . 154N. The accessor 158 mounts and unmounts tape drives 154A . . . 154N.

Figure 2:
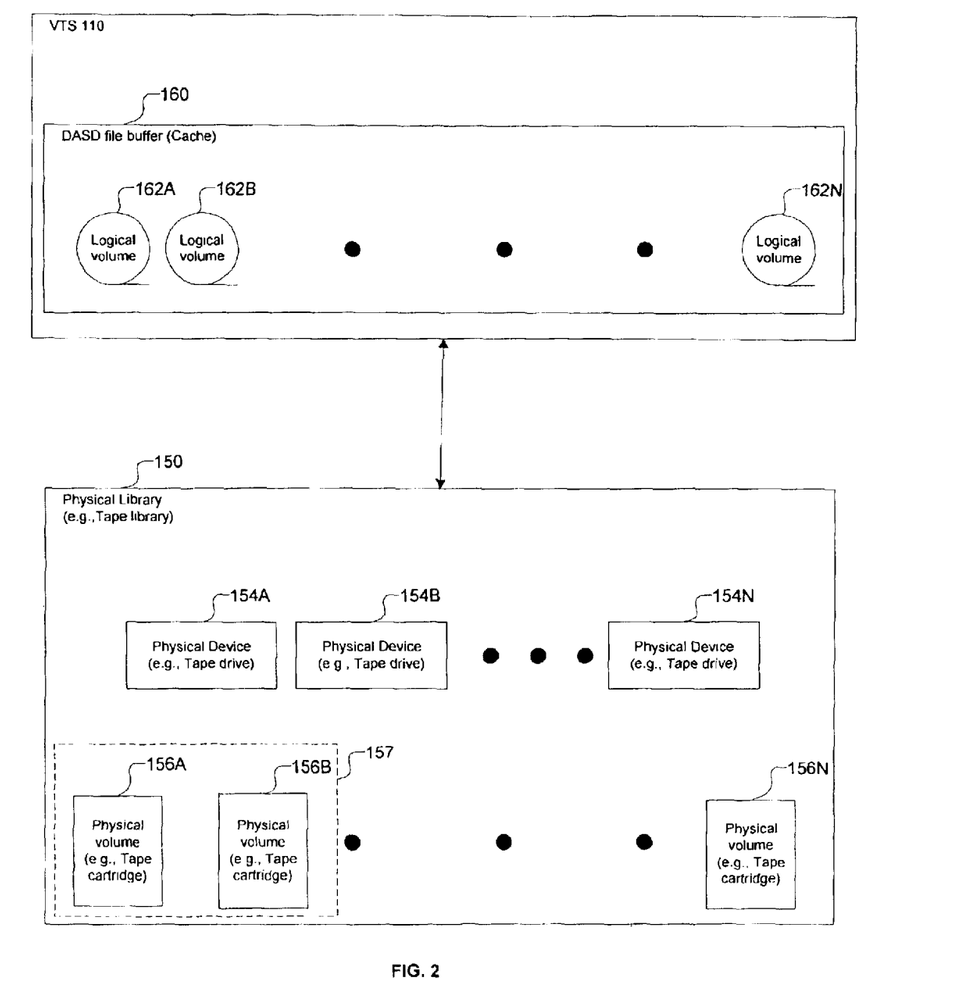
FIG. 2 illustrates a block diagram including a virtual tape server, a cache, and a physical library, in accordance with certain implementations of the invention.

FIG. 2 illustrates a block diagram including the VTS 110, the cache 160 and the physical library 150, in accordance with certain implementations of the invention. The physical library 150, in addition to including the physical devices 154A . . . 154N, includes physical volumes 156A . . . 156N. A physical volume 156A . . . 156N may be mounted on any of the physical devices 154A . . . 154N. In certain implementations the physical volumes 156A . . . 156N are tape cartridges that may be mounted via mechanical mounting onto the physical devices 154A . . . 154N that are tape drives. In alternative implementations the physical volumes 156A . . . 156N may be CD ROMs, DVDs or other storage media. In certain implementations, the number of physical volumes 156A . . . 156N are larger than the number of physical devices 154A . . . 154N. The physical volumes 154A . . . 154N may be organized into pools. For example, physical volumes 156A and 156B may be in pool 157.

The major operations occurring between the cache 160 and the physical devices 154A . . . 154N are premigration (i.e., the transfer of data from the cache 160 to the physical volumes 156A . . . 156N) and recall (i.e., the transfer of data from the physical volumes 156A . . . 156N to the cache 160). In certain implementations the VTS 110 provides an N:1 ratio, where N is typically 10–20, of logical devices to physical devices 154A . . . 154N. In such implementations, since there are more physical volumes 156A . . . 156N (corresponding to the logical volumes 162 stored in the logical devices) than physical devices 154A . . . 154N, there may be time periods when the VTS 110 has more physical volumes 156A . . . 156N to be mounted for recalls than there are physical devices 154A . . . 154N in the VTS 110. As a result, physical volumes 156A . . . 156N may need to be unmounted so that other physical volumes 156A . . . 156N may be mounted.

When a host 102 requests a logical volume from the VTS 110, a cache hit occurs if the logical volume is resident in the cache 160. If the logical volume is not resident in the cache, the storage manager 130 determines whether the corresponding physical volume 156A . . . 156N is mounted on one of the physical devices 154A . . . 154N. If the corresponding physical volume 156A . . . 156N is not mounted then the storage manager 130 mounts the corresponding physical volume 156A . . . 156N on one of the physical devices 154A . . . 154N. The data for the logical volume is then transferred back, i.e., recalled, from the corresponding physical volume 156A . . . 156N. In certain implementations, recall operations can take several minutes, the recall latency may include the time for a robotic arm to access a tape cartridge and insert the tape cartridge into a tape drive, and the recall latency may include the time to locate the tape to a desired location.

The storage manager 130 maps a plurality of logical volumes 162 within cache 160 to a plurality of logical (virtual) devices. The hosts 102 perform V/O operations by accessing logical (virtual) volumes in the logical devices via the VTS 110. The storage manager 130 maps the logical volumes 162 to the physical volumes 156A . . . 156N. Although the hosts 102 access data via logical volumes and logical devices, the data is physically stored in the physical volumes 156A . . . 156N mountable on the physical devices 154A . . . 154N.

The logical volumes 162A . . . 162N corresponding to the physical volumes 156A . . . 156N may be resident in the cache 160. In FIG. 2, the cache 160 contains logical volumes 162A . . . 162N. The logical volumes resident on the cache 160 may change over time. The storage manager 130 attempts to keep the more likely to be used logical volumes in the cache 160.

When a host 102 writes a logical volume to the VTS 110, the data is stored as a file in the cache 160. The cached data is later premigrated onto a physical volume 156A . . . 156N. The original logical volume is left in the cache 160 for cache hits. When the cache 160 fills to a predetermined threshold, the logical volume data for a selected logical volume 162A . . . 162N is removed from the cache to free space for more logical volumes. In certain implementations, the storage manager 130 removes from the cache 160 a selected logical volume 162A . . . 162N that has been resident on the cache 160 for the longest period of time (i.e., the least recently used logical volume).

Figure 3:
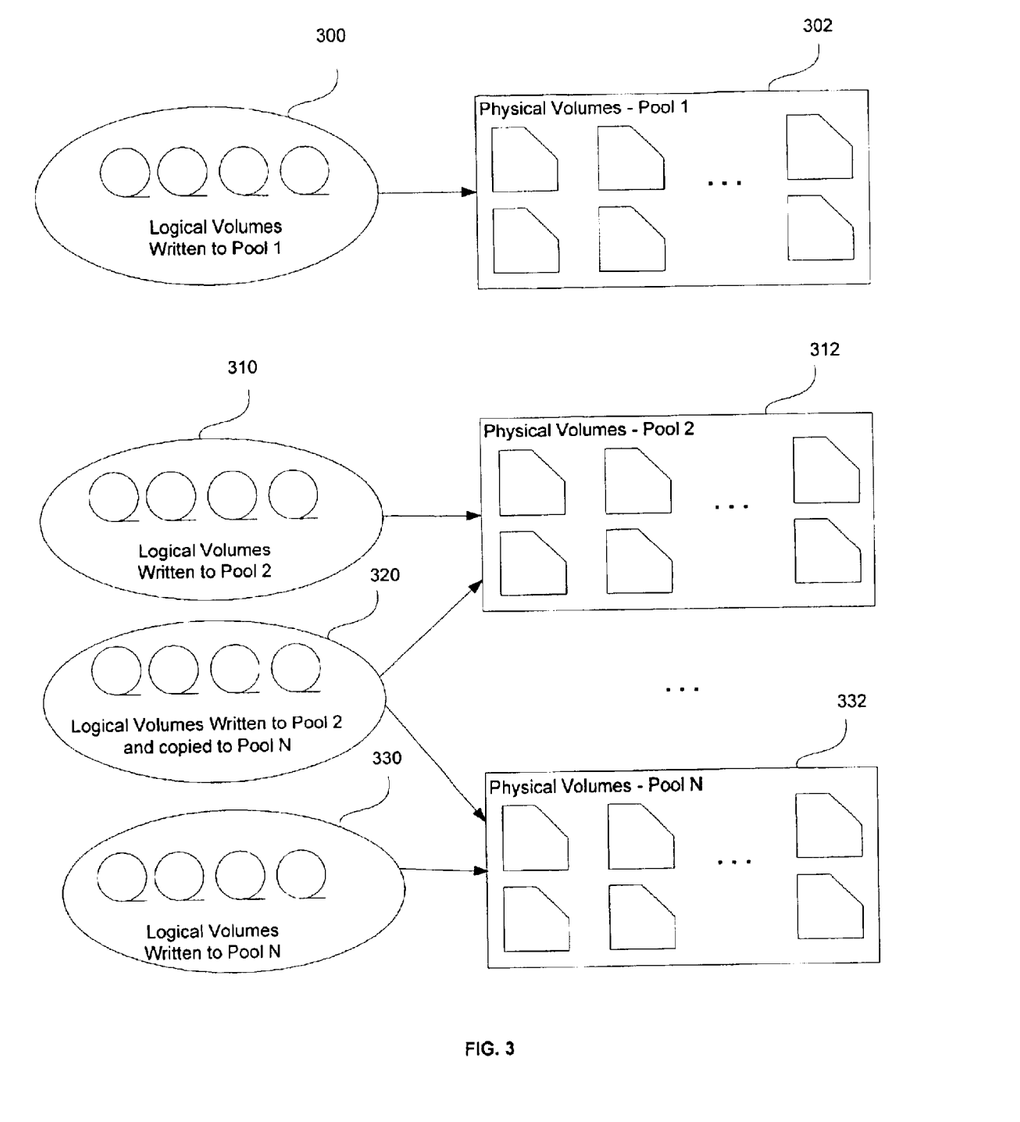
FIG. 3 illustrates, in a block diagram, logical volumes and pools of physical volumes in accordance with certain implementations of the invention.

FIG. 3 illustrates, in a block diagram, logical volumes and pools of physical volumes in accordance with certain implementations of the invention. The physical volumes are grouped into pools 302, 312, and 332. Logical volumes 300, 310, 320, and 330 reside in cache 160, and physical volumes in pools 302, 312, and 332 reside on, for example, tape cartridges. In the case of a single pool of physical volumes, all logical volumes may be written to any of the physical volumes managed by the VTS 110, and only one copy of a logical volume is written into the physical volume pool. On the other hand, the VTS 110 uses multiple pools of physical volumes. In certain implementations, the physical volumes are separated into one of 33 different pools, however, in other implementations, fewer or more pools may be formed. One of these 33 pools holds empty physical volumes (e.g., tape cartridges) and represents a common scratch pool. The other 32 pools contain a mixture of empty, full, and filling physical volumes (e.g., tape cartridges). A physical volume belongs to one of the pools 302, 312, or 332.

Logical volumes 300, 310, 320, and 330 are assigned to one of the pools 302, 312, and 332 by the hosts 102. The hosts 102 can also indicate that a logical volume (e.g., 320) ("original logical volume") is to have a copy ("backup volume") created. The copy of the original logical volume resides in a different pool 332 than the original logical volume, which is in pool 312. Because physical volumes are separated by pools, and since original and backup copies of a logical volume 320 are not on the same physical volume, both cannot be destroyed through the destruction of a single physical volume or of a pool of physical volumes.

Multiple pools 302, 312, and 332 allow customers that run service bureaus with multiple client customers to separate each of their client's data onto a separate pool 302, 312, and 332 of physical volumes.

Using multiple pools 302, 312, and 332 creates inefficiencies in premigrating data to physical volumes. In particular, logical volumes are written to physical volume pools. Since data in the cache 160 is transferred in a least recently used order, if a logical volume for a first pool is transferred, a physical volume for that pool is mounted. Next, if a logical volume for a second pools is transferred, a physical volume for the second pool is mounted. Thus, if single logical volumes for different pools are transferred in sequential order, it is possible that many physical volumes will need to be mounted and unmounted, which is time consuming and inefficient.

To overcome the inefficiencies of using multiple pools 302, 312, and 332, logical volumes are chained together, forming a large chain of data, to efficiently premigrate data. In certain embodiments, a minimum threshold of data (e.g., five gigabytes) is used to create a large chain of data. In certain embodiments, a minimum number of logical volumes (e.g., four logical volumes) is used to create a large chain of data. For example, with the chaining technique, once a certain number of logical volumes for a single pool are ready to be premigrated, all of the logical volumes in the single pool are premigrated. If a pool contains less data than that required to form a large chain, the data requiring premigration is "trapped" in cache 160. For example, if there is only one logical volume for a pool that requires premigration, the single logical volume may be left "trapped" in cache 160. Thus, premigration chaining techniques in a VTS with multiple volume pools may leave some volumes "trapped" in a cache, without premigrating them to tape.

Figure 4A:
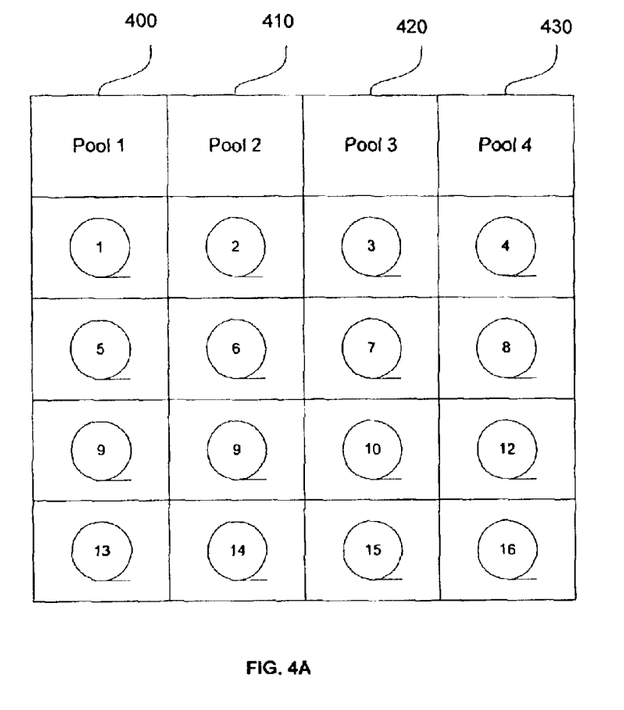
FIGS. 4A and 4B illustrate, in block diagrams, how a chain of logical volumes are premigrated in accordance with certain implementations of the invention.
Figure 4B:
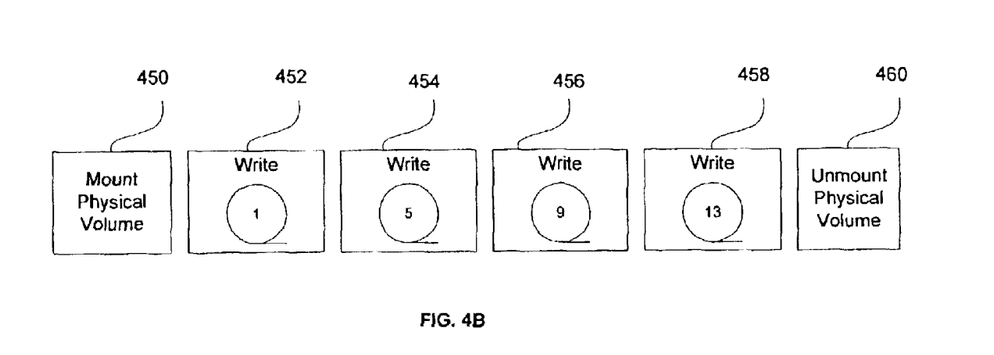

FIGS. 4A and 4B illustrate, in block diagrams, how a chain of logical volumes are premigrated in accordance with certain implementations of the invention. For each pool of physical volumes 400, 410, 420, and 430, in this example, there are four logical volumes ready to be written. Merely for illustration, the example of FIG. 4B uses five gigabytes of data (which, in the example, is equivalent to four logical volumes) to create a large chain. When a large chain of data is ready to be premigrated to a pool 400, 410, 420, or 430, a physical device 154 is mounted with a physical volume 156 (block 450), each logical volume in the pool 400, 410, 420, or 430 is written to the physical volume 156 mounted on the physical device 154 (blocks 452, 454, 456, and 458), and the physical volume 156 is unmounted from the physical device 156. In certain embodiments, each grouping of logical volumes in a pool 400, 410, 420, or 430 is written to a physical volume on a physical device. FIG. 4B illustrates the premigration of logical volumes that are to be written to pool-1 400. In certain implementations, the autonomic cache control 140 monitors the physical devices 154, and, when a physical device 154 is idle (i.e., data is not being written to a physical volume 156 mounted on the physical device 154), the autonomic cache control 140 causes the physical device 154 to be unmounted and remounted with another physical volume 156 via the tape data server. The tape data server notifies the library manager 152 to unmount and remount physical devices 154.

Figure 5A:
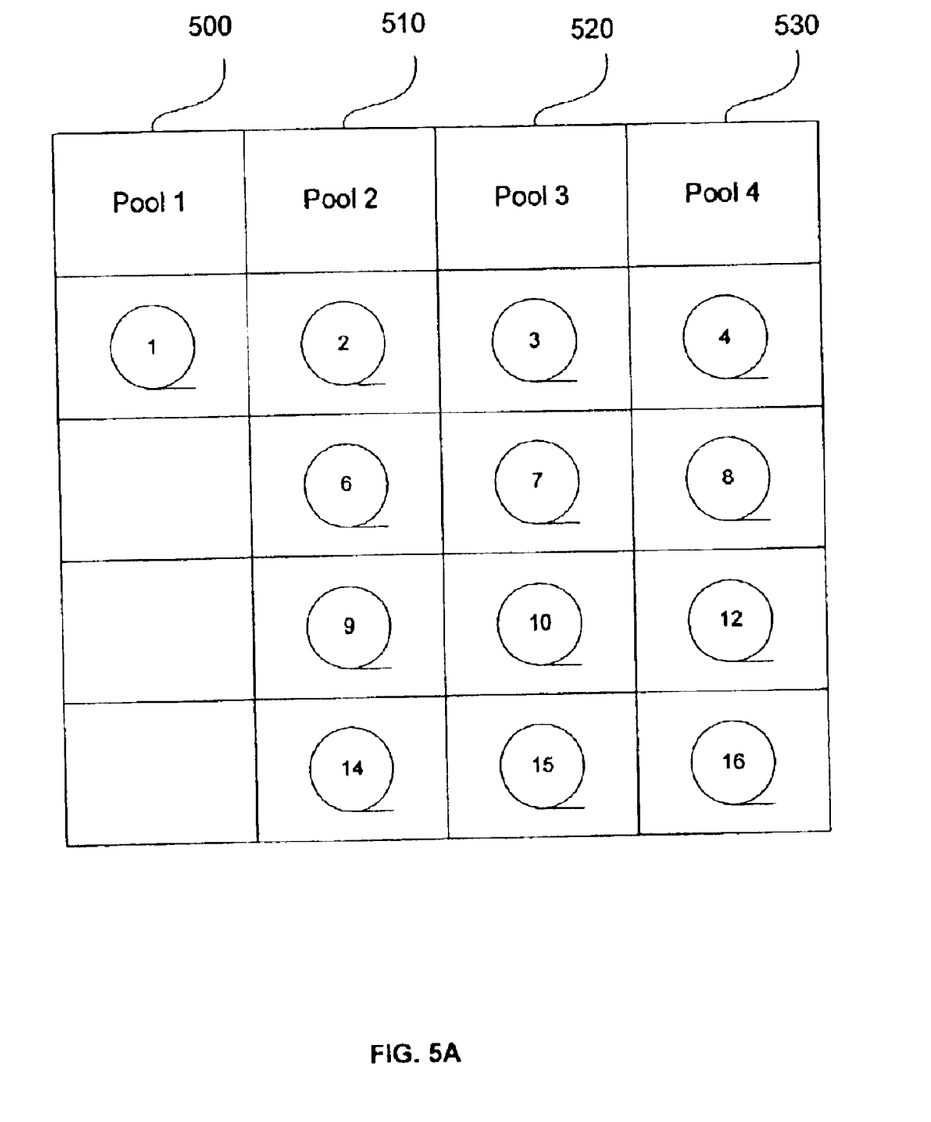
FIGS. 5A and 5B illustrate, in block diagrams, premigration of data that leaves some data trapped in cache in accordance with certain implementations of the invention.
Figure 5B:
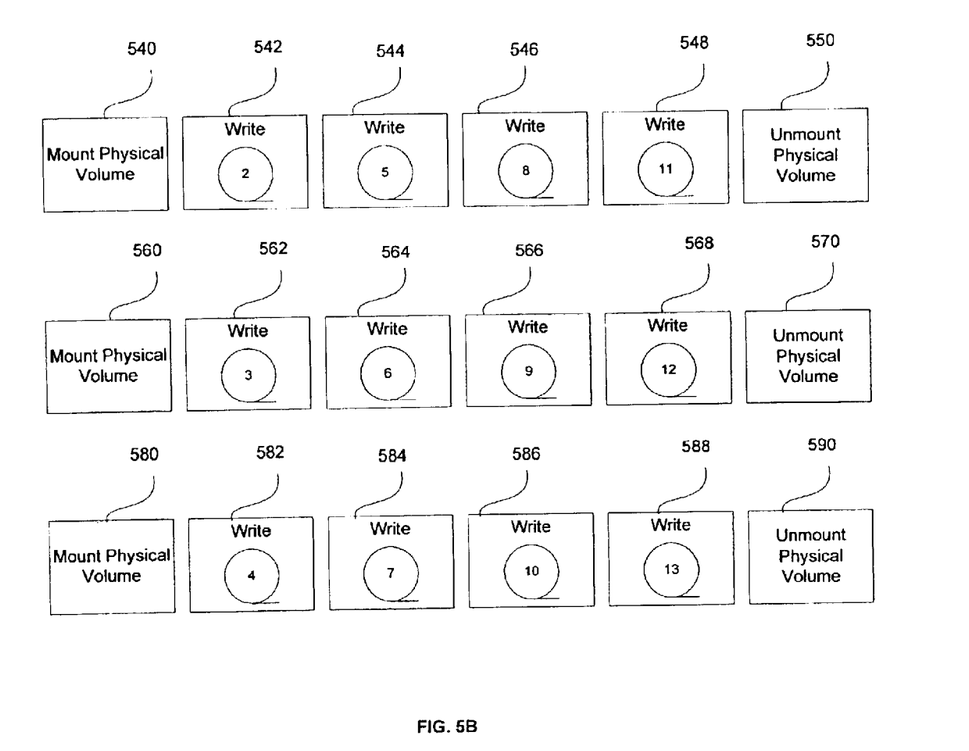

FIGS. 5A and 5B illustrate, in block diagrams, premigration of data that leaves some data trapped in cache 160 in accordance with certain implementations of the invention. If a pool has insufficient data to generate a large chain, the premigration chaining technique "traps" the data in cache. In FIG. 5A, only one logical volume is ready to be premigrated to a physical volume in pool-1 500, while four logical volumes are ready for premigration to physical volumes in pool-2 510, pool-3 520, and pool-4 530. Therefore, with the chaining technique, logical volumes are premigrated to pool-2 510 (blocks 540–550), pool-3 520 (blocks 560–570), and pool-4 530 (blocks 580–590). The oldest logical volume in this example (volume 1) would not be premigrated to a physical volume.

The trapped logical volumes occupy space in the cache that would otherwise be used by more recent logical volumes, the ones most likely to be requested by the host. Moreover, the trapped logical volumes may be left in cache with no copy ever written to the tape if the host does not write more data to their volume pool and the total data in the volume pool is less than the amount required to build a chain. It is possible, therefore, that a complete cache failure could occur, and the logical volumes would be lost since there would be no copy on physical volumes.

Figure 6:
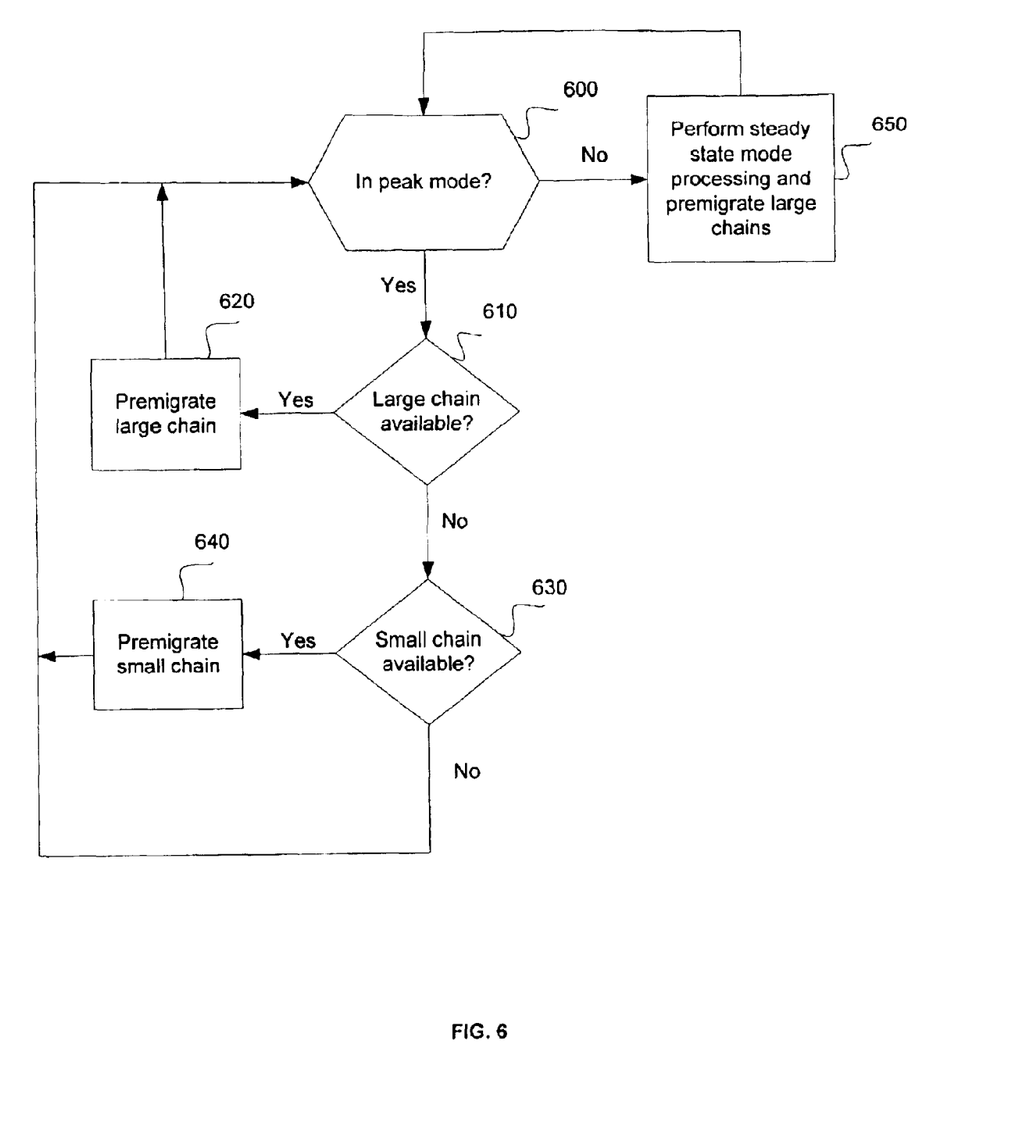
FIG. 6 illustrates logic implemented in the storage manager to premigrate trapped logical volumes in accordance with certain implementations of the invention.

In certain implementations, a two pronged approach is used to solve the problem of trapped logical volumes. FIG. 6 illustrates logic implemented in the storage manager 130 to premigrate trapped logical volumes in accordance with certain implementations of the invention. Control begins in block 600 with the storage manager 130 determining whether the VTS 110 is in peak mode. The VTS 110 has two modes of operation: steady state and peak. The VTS 110 may switch between the two modes over a period of time. In steady state mode, the rate at which logical volumes 162 are premigrated to physical volumes 156 matches the rate that the hosts 102 can write data to the VTS 110. For example, in a case in which the cache 160 is full, the VTS 110 operates in steady state mode. In peak mode, the VTS 110 defers premigration of data to physical volumes to allow the hosts 102 to write data to the VTS 110 faster than the VTS 110 is writing data to the physical volumes.

In block 600, if it is determined that the VTS 110 is not in peak mode, processing continues to block 650 and steady state mode processing is performed and large chains are premigrated. In particular, in certain implementations, in steady state mode, large chains (e.g., five gigabytes of data) are used to maintain peak premigration efficiency, since the rate that the VTS 110 can premigrate data directly affects the performance of each of the hosts 102.

In peak mode, the VTS 110 does not have to be as efficient as in steady state mode since the host 102 write rate is buffered by the VTS 110 cache 160, and the VTS 110 does not have to premigrate data at peak efficiency.

In block 600, if it is determined that the VTS 110 is in peak mode, processing continues to block 610, and the storage manager 130 determines whether a large chain is available for premigration. If a large chain is available, processing continues to block 620 and the large chain is premigrated. If a large chain is not available, processing continues to block 630.

In block 630, the storage manager 130 determines whether a small chain is available. If so, processing continues to block 640 and the small chain is premigrated, otherwise, processing continues to block 600.

Thus, in peak mode, if the VTS 10 is unable to locate any large chains of data, the VTS selects chains that meet a smaller threshold. For certain implementations, the smaller threshold was empirically determined to be two gigabytes. Although this premigration is less efficient than moving large chains, it is preferable to move some data less efficiently than to not move the trapped data at all while waiting for a large chain to be created.

Figure 7:
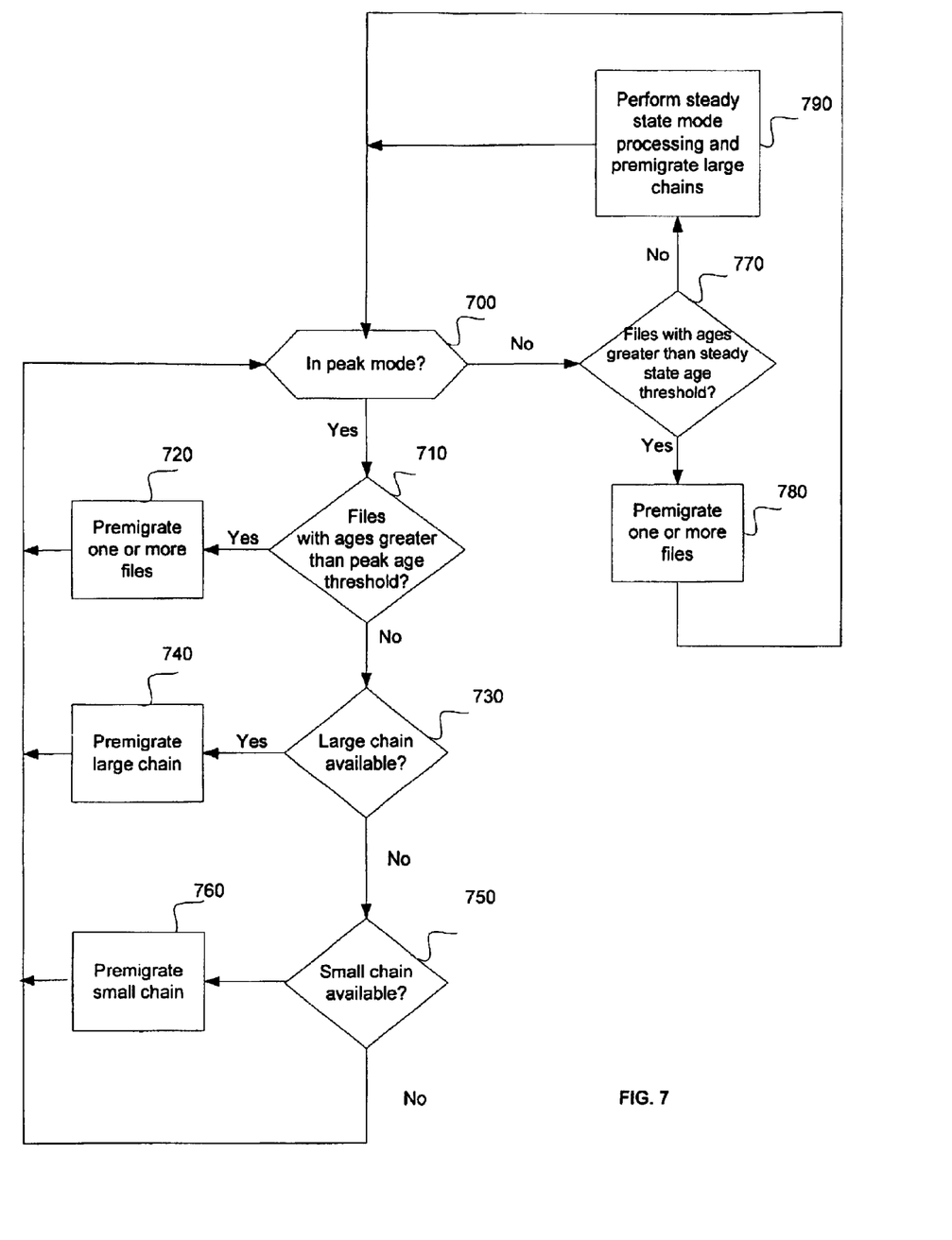
FIG. 7 illustrates logic implemented in the storage manager to premigrate trapped logical volumes in accordance with certain additional implementations of the invention.

FIG. 7 illustrates logic implemented in the storage manager 130 to premigrate trapped logical volumes in accordance with certain additional implementations of the invention. Even with the shorter chain criteria in effect, individual files may be skipped indefinitely, since they may not meet even the shorter chain criteria. In order to ensure that these files are premigrated out of cache to tape, an age threshold is maintained in the VTS 110. Any files that are in cache longer than the age threshold are selected to be premigrated from the cache along with any other eligible files in their pool, even if the chain generated does not meet the large or small chain length criteria. Thus, every file in the VTS 110 cache 160 is premigrated. In different implementations, different age criteria may be used. For example, a shorter time threshold may be used when the VTS 110 is in peak mode (i.e., a "peak age threshold"), and a longer threshold may be used when the VTS 110 is in steady state mode (i.e., a "steady state age threshold").

In FIG. 7, control begins at block 700 with the storage manager 700 determining whether the VTS 110 is in peak mode. If so, processing continues to block 710, otherwise processing continues to block 770. In block 770, the storage manager determines whether there are any files in cache 160 with ages greater than the steady state age threshold. If there are files with ages greater than the steady state age threshold, the files are premigrated (block 780), otherwise, processing continues to block 790. In block 790, steady state mode processing is performed and large chains are premigrated.

In block 710, the storage manager determines whether there are any files in cache 160 with ages greater than the peak age threshold. If there are files with ages greater than the peak age threshold, the files are premigrated (block 720), otherwise, processing continues to block 730. In block 730, the storage manager 130 determines whether a large chain is available for premigration. If a large chain is available, processing continues to block 740 and the large chain is premigrated. If a large chain is not available, processing continues to block 750. In block 750, the storage manager 130 determines whether a small chain is available. If so, processing continues to block 760 and the small chain is premigrated, otherwise, processing continues to block 700.

Thus, with implementations of the invention, data left in cache 160 by chaining requirements is premigrated from cache 160 to physical volumes 156.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art."

In the described implementations, certain variables, such as N are used to denote integer values indicating a certain number of elements. These variables may denote any number when used at different instances with the same or different elements. For example, in FIG. 2, for logical volumes 162A . . . N, N may represent Q number of elements; while for physical devices 154A . . . N, N may represent M number of elements; and, for physical volumes 156A . . . N, N may represent P number of elements.

The logic of FIGS. 6 and 7 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The logic of FIGS. 6 and 7 was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

Although the examples herein referred to premigration of data from cache to physical volumes, the techniques of the invention are applicable to transfer of data between any source and target.

Figure 8:
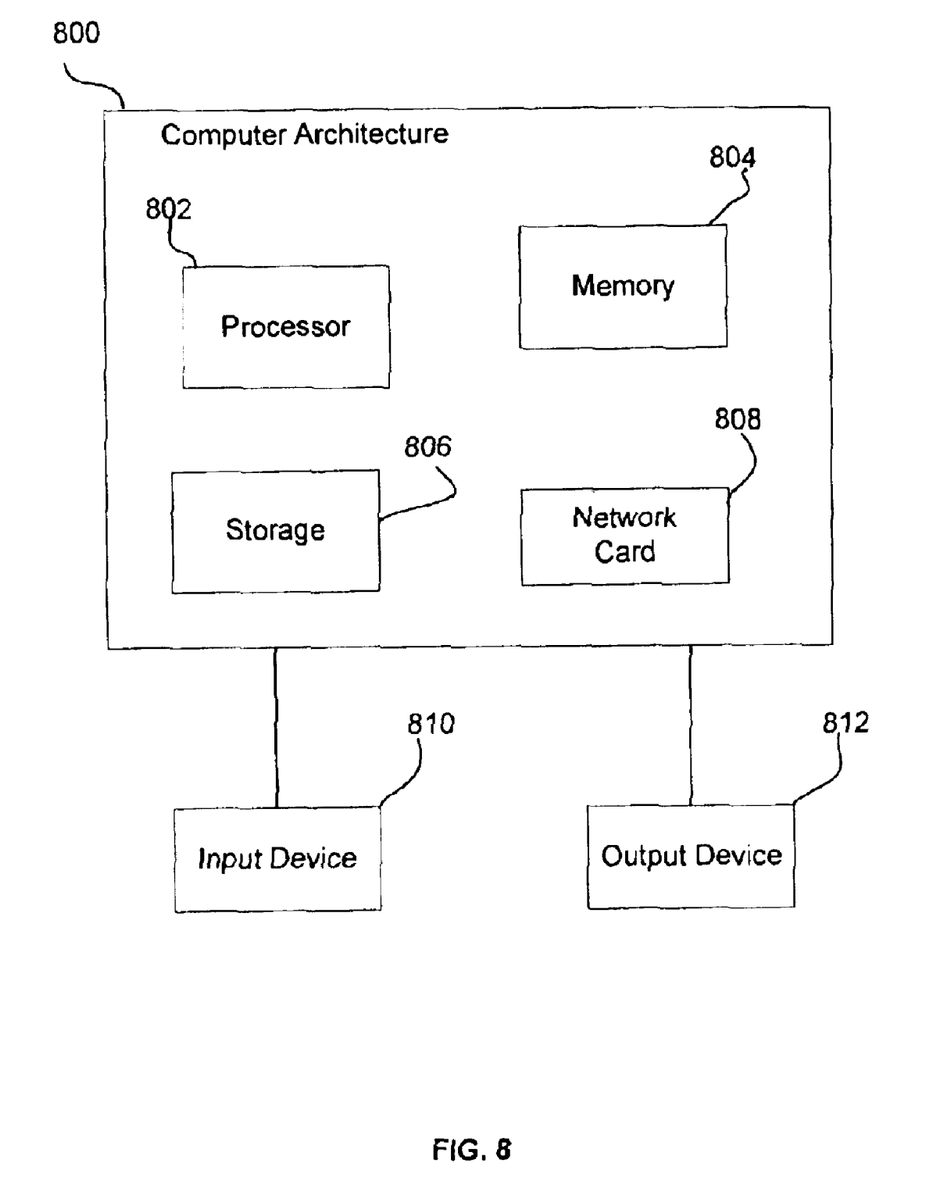
FIG. 8 illustrates one implementation of the architecture of hosts, operator interfaces, and VTS.

FIG. 8 illustrates one implementation of the architecture of hosts 102, operator interfaces 104, and VTS 110. The hosts 102, operator interfaces 104, and VTS 110 may implement a computer architecture 800 having a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

While the hosts 102 and the VTS 110 communicate within a client-server paradigm in the described implementations, the hosts 102 and the VTS 110 may also communicate within a peer-to-peer or any other paradigm known in the art.

Furthermore, many of the software and hardware components have been described in separate modules for purposes of illustration. Such components may be integrated into a fewer number of components or divided into a larger number of components. Additionally, certain operations described as performed by a specific component may be performed by other components.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for transferring data, comprising:
   identifying whether data is being transferred to one or more physical volumes in peak mode;
   if the data is being transferred in peak mode, determining whether a large chain of data is available for transfer to the one or more physical volumes;
   if the large chain of data is not available, determining whether a small chain of data is available for transfer to the one or more physical volumes; and
   if the small chain of data is available, transferring the small chain of data to the one or more physical volumes.

2. The method of claim 1, wherein the small chain of data comprises one or more logical volumes and wherein transferring the small chain of data further comprises:
   transferring the one or more logical volumes from a cache to the one or more physical volumes mounted on physical devices.

3. The method of claim 2, wherein the one or more physical volumes are organized into pools of physical volumes and wherein transferring the small chain of data further comprises:
   transferring each of the logical volumes to one of the pools of physical volumes.

4. The method of claim 1, wherein it is determined that the large chain of data is available and further comprising:
   transferring the large chain of data to the one or more physical volumes.

5. The method of claim 4, wherein the large chain of data comprises one or more logical volumes and wherein transferring the large chain of data comprises transferring the one or more logical volumes from a cache to the one or more physical volumes mounted on physical devices.

6. The method of claim 5, wherein the one or more physical volumes are organized into pools of physical volumes and wherein transferring the large chain of data further comprises:
   transferring each of the logical volumes to one of the pools of physical volumes.

7. The method of claim 1, further comprising:
   determining that the data is being transferred in steady state mode; and
   transferring one or more large chains of data to the one or more physical volumes.

8. The method of claim 1, wherein the large chain of data comprises five gigabytes.

9. The method of claim 1, wherein the small chain of data comprises two gigabytes.

10. The method of claim 1, further comprising:
    determining that the data is being transferred in steady state mode;
    determining whether one or more files that have ages greater than a steady state age threshold are available; and
    if one or more files that have ages greater than the steady state age threshold are available, transferring the one or more files to the one or more physical volumes.

11. The method of claim 1, further comprising:
    if the data is being transferred in peak mode, determining whether one or more files that have ages greater than a peak age threshold are available prior to determining whether the large chain of data is available for transfer; and
    if one or more files that have ages greater than the peak age threshold are available, transferring the one or more files to the one or more physical volumes.

12. A system for transferring data, comprising:
    a cache;
    one or more physical volumes;
    means for identifying whether data is being transferred from the cache to the one or more physical volumes in peak mode;
    if the data is being transferred in peak mode, means for determining whether a large chain of data is available for transfer to the one or more physical volumes;
    if the large chain of data is not available, means for determining whether a small chain of data is available for transfer to the one or more physical volumes; and
    if the small chain of data is available, means for transferring the small chain of data to the one or more physical volumes.

13. The system of claim 12, wherein the small chain of data comprises one or more logical volumes and wherein means for transferring the small chain of data further comprises:
    means for transferring the one or more logical volumes from the cache to the one or more physical volumes mounted on physical devices.

14. The system of claim 13, wherein the physical volumes are organized into pools of physical volumes and wherein means for transferring the small chain of data further comprises:
    means for transferring each of the logical volumes to one of the pools of physical volumes.

15. The system of claim 12, wherein it is determined that the large chain of data is available and further comprising:
    means for transferring the large chain of data to physical volumes.

16. The system of claim 15, wherein the large chain of data comprises one or more logical volumes and wherein means for transferring the large chain of data further comprises:
    means for transferring the one or more logical volumes from the cache to the one or more physical volumes mounted on physical devices.

17. The system of claim 16, wherein the one or more physical volumes are organized into pools of physical volumes and wherein means for transferring the large chain of data further comprises:

means for transferring each of the logical volumes to one of the pools of physical volumes.

18. The system of claim 12, further comprising:

means for determining that the data is being transferred in steady state mode; and means for transferring one or more large chains of data to the one or more physical volumes.

19. The system of claim 12, wherein the large chain of data comprises five gigabytes.

20. The system of claim 12, wherein the small chain of data comprises two gigabytes.

21. The system of claim 12, further comprising:

means for determining that the data is being transferred in steady state mode;

means for determining whether one or more files that have ages greater than a steady state age threshold are available; and if one or more files that have ages greater than the steady state age threshold are available, means for transferring the one or more files to the one or more physical volumes.

22. The system of claim 12, further comprising:

if the data is being transferred in peak mode, means for determining whether one or more files that have ages greater than a peak age threshold are available prior to determining whether the large chain of data is available for transfer; and if one or more files that have ages greater than the peak age threshold are available, means transferring the one or more files to the one or more physical volumes.

23. A article of manufacture for transferring data, wherein the article of manufacture is capable of causing operations to be performed, the operations comprising:

identifying whether data is being transferred to one or more physical volumes in peak mode;

if the data is being transferred in peak mode, determining whether a large chain of data is available for transfer to the one or more physical volumes;

if the large chain of data is not available, determining whether a small chain of data is available for transfer to the one or more physical volumes; and if the small chain of data is available, transferring the small chain of data to the one or more physical volumes.

24. The article of manufacture of claim 23, wherein the small chain of data comprises one or more logical volumes and wherein the operations for transferring the small chain of data further comprise:

transferring the one or more logical volumes from a cache to the one or more physical volumes mounted on physical devices.

25. The article of manufacture of claim 24, wherein the one or more physical volumes are organized into pools of physical volumes and wherein the operations for transferring the small chain of data further comprise:

transferring each of the logical volumes to one of the pools of physical volumes.

26. The article of manufacture of claim 23, wherein it is determined that the large chain of data is available and the operations further comprise:

transferring the large chain of data to the one or more physical volumes.

27. The article of manufacture of claim 26, wherein the large chain of data comprises one or more logical volumes and wherein the operations for transferring the large chain of data further comprise:

transferring the one or more logical volumes from a cache to the one or more physical volumes mounted on physical devices.

28. The article of manufacture of claim 27, wherein the one or more physical volumes are organized into pools of physical volumes and wherein the operations for transferring the large chain of data further comprise:

transferring each of the logical volumes to one of the pools of physical volumes.

29. The article of manufacture of claim 23, the operations further comprising:

determining that the data is being transferred in steady state mode; and transferring one or more large chains of data to the one or more physical volumes.

30. The article of manufacture of claim 23, wherein the large chain of data comprises five gigabytes.

31. The article of manufacture of claim 23, wherein the small chain of data comprises two gigabytes.

32. The article of manufacture of claim 23, the operations further comprising:

determining that the data is being transferred in steady state mode;

determining whether one or more files that have ages greater than a steady state age threshold are available; and if one or more files that have ages greater than the steady state age threshold are available, transferring the one or more files to the one or more physical volumes.

33. The article of manufacture of claim 23, the operations further comprising:

if the data is being transferred in peak mode, determining whether one or more files that have ages greater than a peak age threshold are available prior to determining whether the large chain of data is available for transfer; and if one or more files that have ages greater than the peak age threshold are available, transferring the one or more files to the one or more physical volumes.

* * * * *